Dec. 19, 1922.
C. C. FARMER.
CONTROL SWITCH FOR VACUUM BRAKE SYSTEMS.
FILED FEB. 17, 1921.
1,439,467.
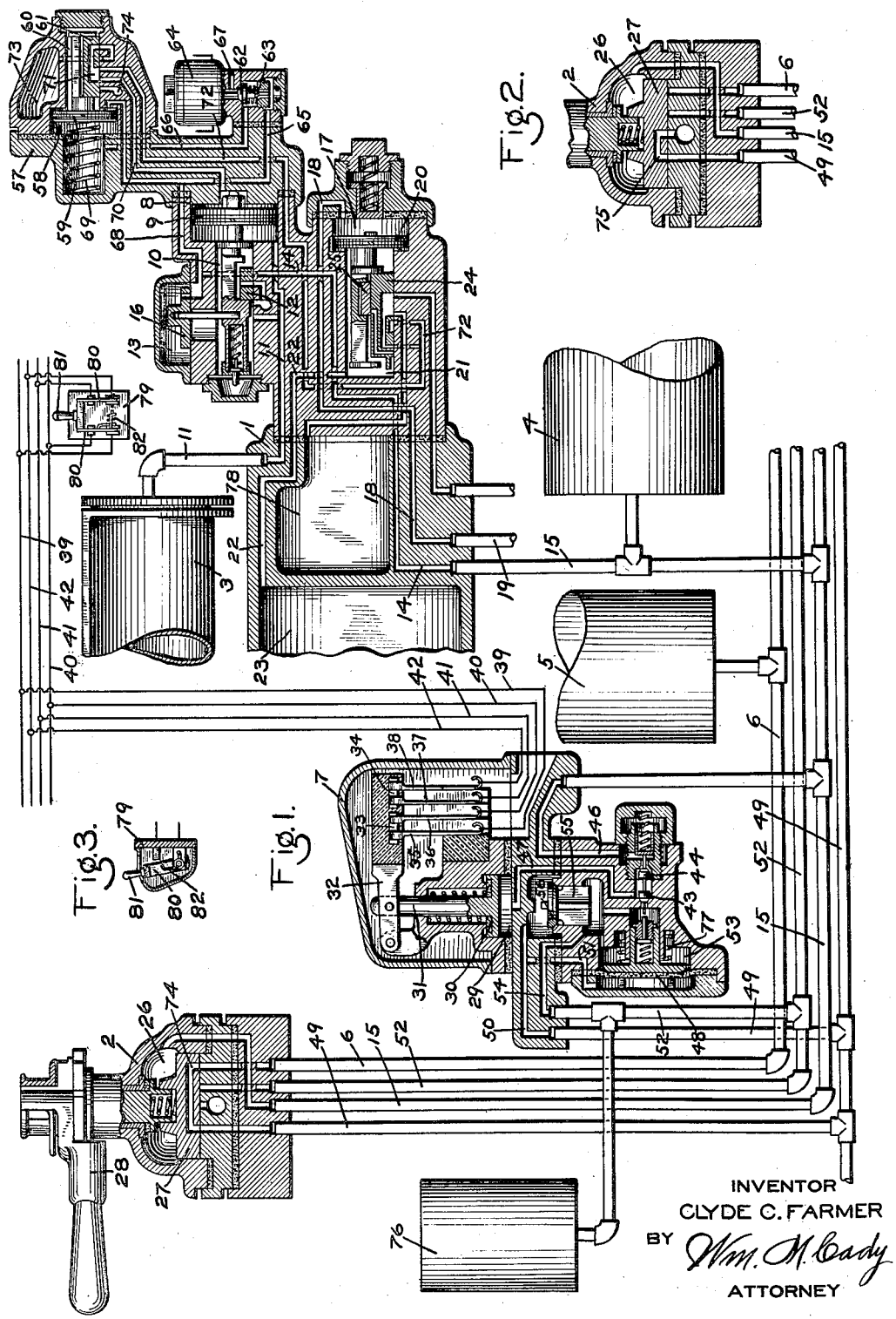
INVENTOR
CLYDE C. FARMER
BY Wm. M. Cady
ATTORNEY Patented Dec. 19, 1922.

1,439,467

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CONTROL SWITCH FOR VACUUM BRAKE SYSTEMS.

Application filed February 17, 1921. Serial No. 445,780.

*To all whom it may concern:*

Be it known that I, CLYDE C. FARMER, a citizen of the United States, residing at Edgewood, in the county of Allegheny and State of Pennsylvania, have invented new and useful Improvements in Control Switches for Vacuum Brake Systems, of which the following is a specification.

This invention relates to vacuum and compressed fluid brakes and more particularly to a brake equipment associated with a regenerative brake apparatus.

One object of my invention is to provide improved means for preventing a fluid pressure brake application when the regenerative brake is acting.

Another object of my invention is to provide improved means for preventing the regenerative brake from acting when an emergency application of the brakes is effected.

Another object of my invention is to provide improved means for cutting off current to the driving motors when the main reservoir pressure is below a predetermined safe degree.

Other objects and advantages will appear in the following more detailed description of the invention.

In the accompanying drawing; Fig. 1 is a diagrammatic view, partly in section, of a vacuum and compressed fluid brake equipment embodying my invention; Fig. 2 a sectional view of the brake valve device in emergency application position; and Fig. 3 a transverse sectional view of the protection switch.

The construction shown in Fig. 1 comprises a distributing valve device 1, a brake valve device 2, a brake cylinder 3, a main reservoir 4, a vacuum reservoir 5, connected to a vacuum reservoir pipe 6, and an automatic control switch device 7.

The distributing valve device 1 may combine the usual application portion and triple valve or equalizing portion, the application portion having an application chamber 8 containing piston 9, a valve chamber 10, connected by pipe and passage 11 to brake cylinder 3 and containing a release valve 12, and a valve chamber 13, connected by passage 14 to main reservoir pipe 15 and containing an application valve 16 adapted to be operated by piston 9.

The triple valve or equalizing portion has a piston chamber 17 connected by passage 18 to the compressed fluid brake pipe 19 and containing a piston 20 and has a valve chamber 21, connected by passage 22 to a pressure chamber 23 and containing a main slide valve 24 and a graduating slide valve 25, adapted to be operated by piston 20.

The brake valve device 2 comprises a casing having a valve chamber 26, connected to main reservoir pipe 15 and containing a rotary valve 27 adapted to be operated by a handle 28.

The automatic control switch device 7 may comprise a casing having a piston chamber 29 containing a piston 30 having a piston stem 31.

Pivotally attached to the stem 31 is a switch arm 32, having insulated contact bars 33 and 34 for connecting the pairs of contact fingers 35 and 36, and 37 and 38 respectively, said fingers being connected to wires 39, 40, 41, and 42.

The fluid pressure in piston chamber 29 is controlled by double beat valves 43 and 44 and normally a spring 45 holds the valve 44 open and valve 43 closed, so that fluid under pressure is supplied from the main reservoir pipe 15 through passages 46 and 47 to piston chamber 29.

The operation of the double beat valves 43 and 44 is controlled by a flexible diaphragm 48, subject on one side to the pressure in the vacuum brake pipe 49, as supplied through passages 50 and 51, the opposite side being subject to the pressure in a vacuum application pipe 52, to which the diaphragm chamber 53 is connected by passage 54.

A check valve 55 prevents the flow of fluid from the vacuum brake pipe 49 to the vacuum application pipe 52, except by way of a restricted port 56 through the check valve while permitting the practically free flow of air from the vacuum application pipe to the vacuum brake pipe.

In order to prevent the fluid pressure brake on the locomotive from acting when the regenerative brake is acting, a device is applied to the distributing valve device 1 which is adapted, when the regenerative brake is acting, to connect the application cylinder to the exhaust.

For this purpose, a casing 57 is applied to the distributing valve device in place of the usual application cylinder head, said casing have a piston chamber 58, containing a piston 59 and a valve chamber 60 containing a slide valve 61 adapted to be operated by the piston 59.

The operation of piston 59 is controlled by double beat valves 62 and 63 and an electromagnet 64 connected to some control circuit which is energized whenever the regenerative brake is acting.

When the magnet 64 is deenergized, the valve 62 is seated and the valve 63 is open, so that a passage 65 leading from valve chamber 60 is connected to passage 66 leading to piston chamber 58.

When the magnet 64 is energized, the valve 63 is closed and the valve 62 is opened, so that fluid in piston chamber 58 is vented through an exhaust port 67.

The equipment contemplates the use of vacuum brakes on the cars of the train and a compressed fluid brake on the locomotive and variations in fluid pressure in the compressed fluid brake pipe 19, to cause the operation of the distributing valve device, may be effected when the vacuum brakes are applied by means such as are disclosed in the pending application of T. H. Thomas, Serial No. 443,360, filed February 8, 1921.

In operation, the main reservoir 4 is maintained charged with fluid under pressure and valve chamber 13 of the distributing valve device is charged from the main reservoir pipe 15 through passage 14. From valve chamber 13, fluid under pressure is supplied through passage 68 to passage 65 and thence to valve chamber 60.

When the magnet 64 is deenergized, the valve 63 is held open so that fluid under pressure is also supplied to piston chamber 58, and since the fluid pressures on opposite sides of piston 59 are now equal, the spring 69 maintains the piston 59 in the position shown in Fig 1, in which a passage 70, leading to the application cylinder 8, is connected by cavity 71 in slide valve 61 with a passage 72, leading to the seat of triple slide valve 24.

When the cavity 71 connects passages 70 and 72 a chamber 73 is also charged with fluid under pressure, through an extension of the cavity, for a purpose to be hereinafter described.

In release position, the compressed fluid brake pipe 19 is maintained charged with fluid under pressure, so that piston chamber 17 is charged and fluid flows through the usual feed groove around the equalizing piston 20 to the valve chamber 21 and through a passage 22, charging the pressure chamber 23.

In the running position of the brake valve device 2, as shown in Fig. 1, the vacuum reservoir pipe 6 is connected by cavity 74 in the rotary valve 27 with the vacuum brake pipe 49, so that a partial vacuum is maintained in the vacuum brake pipe.

If it is desired to effect a service application of the brakes, the brake valve handle 28 is turned to service position, in which the vacuum application pipe 52 is connected to the atmosphere. Fluid from the atmosphere then flows through the vacuum application pipe to the automatic control switch device 7 and thence through passage 54 past the check valve 55 to the vacuum brake pipe 49.

The increase in pressure in the vacuum brake pipe then produces an application of the brakes on the cars of the train in the usual manner, and on the locomotive, the pressure is reduced in the compressed fluid brake pipe 19, in the manner referred to in the hereinbefore mentioned pending application. The triple piston 20 is then shifted to application position in which fluid is supplied from valve chamber 21 and pressure chamber 23 through passage 72, cavity 71 in slide valve 61 and passage 70 to the application cylinder 8, provided the regenerative brake is not acting and the magnet 64 is deenergized.

The piston 9 is then operated and the release valve 12 is shifted to cut off the exhaust from the brake cylinder, while the application valve 16 is operated to supply fluid under pressure to the brake cylinder 3 in the usual manner.

If, however, the regenerative brake is acting, the magnet 64 will be energized, so that the valve 63 is closed and the valve 62 opened. Fluid is consequently vented from the piston chamber 58, causing the piston 59 to shift the valve 61 and connect the passage 70 with an exhaust port 74, at the same time cutting off and bottling the pressure in chamber 73.

It will now be seen that communication is cut off, through which fluid is supplied to the application cylinder 8 by operation of the triple valve device, so that the brakes cannot be applied on the locomotive when the regenerative brake is acting. Furthermore, if when the compressed air brake is applied on the locomotive, the regenerative brake should be cut in, then the fluid pressure brake will be released, since the application cylinder 8 is connected to the exhaust by the operation of the valve 61.

When a service application of the brakes is made, as above described, the diaphragm 48 will not be operated and consequently the piston 30 and the switch arm 32 will remain in their normal positions.

When an emergency application of the brakes is effected, the brake valve is moved to emergency position, as shown in Fig. 2, in which the vacuum brake pipe 49 is connected directly to the atmosphere, through a cavity 75 in the valve 27.

An emergency application of the vacuum brakes on the cars is thus produced and on the locomotive, the increased pressure in the vacuum brake pipe acts in the chamber at the left of diaphragm 48 to shift the diaphragm, since the pressure therein will increase at a greater rate than in chamber 53 at the opposite side, as admitted through the restricted port 56 in check valve 55.

The valve 44 is then seated and the valve 43 opened, so that fluid is vented from piston chamber 29 through passage 47 to the vacuum application pipe 52 and the piston 30 then shifts the switch arm 32 so as to open the control circuits and thus prevent the operation of the regenerative brake.

A timing reservoir 76 is connected to the vacuum application pipe 52 and requires a certain time for charging, sufficient to ensure that the emergency application of the brakes will be fully effected and the train brought to a stop.

After a predetermined time, the timing reservoir 76 and the vacuum application pipe 52 having become charged to the same pressure as in the vacuum brake pipe 49, the pressures on opposite sides of the diaphragm 48 will be equalized, so that the spring 77 will return the diaphragm 48 to its normal position, permitting the valve 43 to seat and the valve 44 to open, so as to again charge the piston chamber 29 and cause the piston 30 to operate the switch arm 32 so that the control circuits will be again closed and when desired, current may be supplied to the driving motors, in order to start the train.

In making a service application of the brakes, it will be noted that since the pressure in the vacuum brake pipe is increased by flow from the vacuum application pipe, the pressure in the chamber at the left of the diaphragm 48 can never exceed that in chamber 53, so that the diaphragm can not operate in service. When an emergency application of the brakes is made, however, the pressure is increased in the vacuum brake pipe directly and consequently, since the pressure in the vacuum application pipe and chamber 53 can only be built up by flow through the restricted port 56 in the check valve 55, the prompt movement of diaphragm 48 to effect the opening movement of the switch arm 32 is assured.

When the fluid pressure brakes on the locomotive are applied by the operation of the distributing valve device 1, an application chamber 78 is connected to the application cylinder 8 in the usual manner, and while this chamber is cut off from the application cylinder by movement of the slide valve 61 when the regenerative brake is acting, so that the pressure in said chamber will be bottled up, there will be some loss of pressure by the venting of fluid from the application cylinder itself and therefore, if the regenerative brake should fail for any reason and it should be necessary to secure a second fluid pressure brake application, the pressure obtained will not be up to the desired degree, due to this loss of pressure. In order to compensate for this loss, the chamber 73 is provided, so that when the slide valve 61 is moved back to normal position, upon failure of the regenerative brake, fluid will be supplied from the chamber 73 to the application cylinder 8, thus avoiding any loss in pressure in the application cylinder and consequently in the brake cylinder.

If the pressure in the main reservoir 4 should drop below a predetermined degree or if the pressure has not been increased to said degree, then the piston 30 of the automatic control switch device 7 will be operated to move the switch arm 32 and open the control circuits, so that current can not be supplied to the driving motors, and the train can not be started until the pressure in the main reservoir has been increased to the predetermined degree, but in order to permit the train or locomotive to be shifted in case of necessity, as in a car barn or the like, a protection switch device 79 may be provided.

Said switch may comprise switch blades 80 adapted to close the control circuits through the wires 39, 40, 41, and 42 and having an operating handle 81. A spring 82 acts on the switch blades 80 and normally holds the blades in open position, as clearly shown in Fig. 3.

If the operator wishes to temporarily close the control circuits, so as to operate the locomotive, he must hold the switch in its closed position against the resistance of the spring.

Having now described my invention, what I claim as new and desire to secure by Letters Patent is:

1. The combination with a vacuum brake pipe, an increase in pressure in which is adapted to effect an application of the brakes and a vacuum application pipe from which fluid is supplied to the vacuum brake pipe, of means for controlling an electric circuit, the opening of which cuts an electric brake out of action and a movable abutment subject to the opposing pressures of the vacuum brake pipe and the vacuum application pipe for controlling the operation of said means.

2. The combination with a vacuum brake pipe, an increase in pressure in which is adapted to effect an application of the brakes and a vacuum application pipe from which fluid is supplied to the vacuum brake pipe, of a circuit, the opening of which renders a regenerative brake inoperative, means for controlling the opening of said circuit, and a movable abutment subject to the opposing pressures of the vacuum brake pipe and the vacuum application pipe for controlling the operation of said means.

3. The combination with a vacuum brake pipe, an increase in pressure in which is adapted to effect an application of the brakes and a vacuum application pipe from which fluid is supplied to the vacuum brake pipe, of a circuit, the opening of which renders a regenerative brake inoperative, a switch for controlling said circuit, a piston for operating said switch, valve means for varying the pressure on said piston, and a movable abutment subject to the opposing pressures of the vacuum brake pipe and the vacuum application pipe for operating said valve means.

4. The combination with a vacuum brake pipe, an increase in pressure in which is adapted to effect an application of the brakes and a vacuum application pipe from which fluid is supplied to the vacuum brake pipe, of means for controlling a circuit, the opening of which renders an electric brake ineffective, a movable abutment subject to the opposing pressures of the vacuum brake pipe and the vacuum application pipe for operating said means, and a check valve for permitting flow of fluid from the vacuum application pipe to the vacuum brake pipe.

5. The combination with a vacuum brake pipe, an increase in pressure in which is adapted to effect an application of the brakes and a vacuum application pipe from which fluid is supplied to the vacuum brake pipe, of means for controlling a circuit, the opening of which renders an electric brake ineffective, a movable abutment subject to the opposing pressures of the vacuum brake pipe and the vacuum application pipe for operating said means, and a check valve for permitting flow of fluid from the vacuum application pipe to the vacuum brake pipe, and having a restricted port therein for permitting a retarded flow of fluid from the vacuum brake pipe to the vacuum application pipe.

6. The combination with a source of fluid under pressure, electric circuits which are energized when the driving motors are supplied with current and when said motors act as a regenerative brake, and a switch device operated upon a predetermined reduction in the pressure of said source of pressure for opening said circuits, of a fluid pressure brake having means for effecting a service and an emergency application of the brakes and means operative upon an emergency application of the brakes but inoperative upon a service application of the brakes for also operating said switch device.

7. In a vacuum brake system, the combination with a vacuum brake pipe, an increase in pressure in which is adapted to effect an application of the brakes, of a vacuum application pipe from which fluid is supplied to the vacuum brake pipe and a brake valve device for supplying fluid to the vacuum application pipe.

8. In a vacuum brake system, the combination with a vacuum brake pipe, an increase in pressure in which is adapted to effect an application of the brakes, of a vacuum application pipe from which fluid is supplied to the vacuum brake pipe and a brake valve device having a service application position in which the vacuum application pipe is connected to the atmosphere and an emergency application position, in which the vacuum brake pipe is connected to the atmosphere.

9. In a vacuum brake system, the combination with a vacuum brake pipe in which a partial vacuum is normally maintained, of a vacuum application pipe communicating with the vacuum brake pipe and in which a partial vacuum is normally maintained and a brake valve device for connecting the vacuum application pipe to the atmosphere to effect a service application of the brakes and for connecting the vacuum brake pipe to the atmosphere for effecting an emergency application of the brakes.

10. The combination with a vacuum brake pipe, in which a partial vacuum is normally maintained and a vacuum application pipe in which a vacuum is normally maintained, of a switch device for controlling a circuit, the opening of which is adapted to render a regenerative brake ineffective, a movable abutment subject to the opposing pressures of the vacuum brake pipe and the vacuum application pipe for operating said switch device, a timing reservoir connected with the vacuum application pipe, and a restricted port through which fluid is supplied from the vacuum brake pipe to the vacuum application pipe.

11. In a fluid pressure brake, the combination with a distributing valve device having an application cylinder, of means for controlling communication through which fluid under pressure is supplied to said application cylinder and a device operated when a regenerative brake is acting for effecting the operation of said means to cut off said communication.

12. The combination with a fluid pressure brake including a brake cylinder and a distributing valve device having an application cylinder, an increase in pressure in which is adapted to effect the supply of fluid to the brake cylinder, of a valve device for controlling communication through which fluid under pressure is supplied to said application chamber, a circuit which is energized when a regenerative brake is acting, and electrically controlled means for effecting the operation of said valve device to cut off said communication, upon energization of said circuit.

13. The combination with a fluid pressure brake including a brake cylinder and a distributing valve device having an application cylinder, an increase in pressure in which is adapted to effect the supply of fluid to the brake cylinder, of a valve device for controlling communication through which fluid under pressure is supplied to said application chamber, an electro-magnet, and valve means operated upon energization of said magnet for effecting the operation of said valve device to cut off said communication and vent fluid from said application chamber.

14. The combination with a brake cylinder and a distributing valve device having an application cylinder and a piston and valve means operated upon an increase in pressure in the application cylinder for supplying fluid to the brake cylinder, of a circuit which is energized when a regenerative brake is acting and means operated upon deenergization of said circuit for establishing communication through which fluid under pressure is supplied to said application cylinder and upon energization of said circuit for cutting off said communication.

15. The combination with a brake cylinder and a distributing valve device having an application cylinder and a piston and valve means operated upon an increase in pressure in the application cylinder for supplying fluid to the brake cylinder, of a valve device having a position for establishing communication through which fluid under pressure is supplied to the application cylinder, a chamber adapted to be charged with fluid under pressure supplied to the application cylinder, a circuit adapted to be energized when a regenerative brake is acting, and means operated upon energization of said circuit for cutting off communication to said application cylinder and to said chamber.

16. The combination with a vacuum brake pipe, an increase in pressure in which is adapted to effect an application of the brakes, of a switch mechanism for controlling an electric circuit, the opening of which circuit cuts an electric brake out of action, and means operated upon an increase in pressure in the vacuum brake pipe for operating said switch mechanism.

17. The combination with a vacuum brake pipe, an increase in pressure in which is adapted to effect an application of the brakes, of a switch mechanism for controlling an electric circuit, the opening of which circuit cuts an electric brake out of action, and means operated upon an increase in pressure in the vacuum brake pipe in an emergency application of the brakes for operating said switch mechanism.

In testimony whereof I have hereunto set my hand.

CLYDE C. FARMER.